United States Patent [19]

Heger

[11] 3,924,383

[45] Dec. 9, 1975

[54] METHOD FOR MAKING A PLASTIC BAG

[76] Inventor: Donald A. Heger, 3844 E. Tiffin Ave., Des Moines, Iowa 50317

[22] Filed: June 5, 1974

[21] Appl. No.: 476,563

[52] U.S. Cl. .......................... 53/14; 53/28; 53/180; 53/182
[51] Int. Cl.² .................... B65B 9/08; B65B 61/18
[58] Field of Search ....... 53/14, 28, 29, 128, 180 M, 53/182 M; 229/66, 69; 93/8 WA, 33 H, 33 R

[56] References Cited
UNITED STATES PATENTS

| | | | |
|---|---|---|---|
| 2,146,308 | 2/1939 | Maxfield | 53/28 |
| 2,245,738 | 6/1941 | Taylor | 53/14 X |
| 2,248,266 | 7/1941 | Abrams | 229/66 X |
| 2,387,812 | 10/1945 | Sonneborn | 53/180 M |
| 2,983,087 | 5/1961 | Schofield | 229/66 |
| 3,357,152 | 12/1967 | Geigel | 53/29 |
| 3,526,079 | 9/1970 | Maxeiner | 53/180 M |
| 3,622,421 | 11/1971 | Cook | 93/8 WA X |
| 3,670,927 | 6/1972 | Hubbard | 229/66 X |
| 3,812,644 | 5/1974 | Kamikawa | 53/29 |
| 3,813,998 | 6/1974 | Lotto | 93/33 H |

*Primary Examiner*—Travis S. McGehee
*Assistant Examiner*—John Sipos
*Attorney, Agent, or Firm*—Zarley, McKee, Thomte & Voorhees

[57] ABSTRACT

A plastic bag comprises a tubular plastic sheet member having front and rear walls. The upper and lower edges of the front and rear walls are heat sealed in a straight line across the width thereof so as to enclose the sheet member to form a sealed container. A reinforcing seal commences at one of the lateral edges of the container at a point below the straight line seal of the upper edge and continues laterally partially across the width of the front and rear walls and thence upwardly to join the straight line seal at a point spaced laterally inwardly from the other of the lateral edges. A method of the present invention comprises forming a plurality of spaced apart straight line seals across the width of an elongated continuous plastic tube member, forming a reinforcing seal such as described above adjacent each of the straight line seals, placing a grommet in the tube members in the space between the reinforcing seal and the upper straight line seal, and severing the tube member transversely into a plurality of containers with the straight line seals forming the upper sealed edges of each of the containers.

5 Claims, 4 Drawing Figures

METHOD FOR MAKING A PLASTIC BAG

SUMMARY OF THE INVENTION

This invention relates to a plastic bag and a method for making same. Many items are stored in small plastic bags, as for example, dried vegetables (rice, popcorn, peas, etc.); small packages of nuts, bolts, etc.; long slender objects such as pencils, soda straws, etc.; powdered-like materials such as sugar, flour, etc.; and paste-like materials such as baby food, catsup, mustard, etc.

The present invention contemplates providing a bag for these items which is formed of a tubular plastic material and which includes heat seals across the upper and lower edges thereof. A reinforcing seal is spaced below the upper edge seal and extends partially across the width of the plastic bag and then upwardly where it joins the upper edge seal at a point spaced from one edge of the seal. Thus when the upper edge seal is broken, the pouring spout is formed on one side of the reinforcing seal with the reinforcing seal sealing the remainder of the upper edge of the bag.

Therefore, a primary object of the present invention is the provision of a plastic bag having a pouring spout formed therein.

A further object of the present invention is the provision of a plastic bag which permits a portion of the upper edge of the bag to be opened into a pouring spout while keeping the remainder closed and sealed.

A further object of the present invention is the provision of a plastic bag which includes a pouring spout having a smooth contour so as to permit the easy removal of the contents of the bag.

A further object of the present invention is the provision of a plastic bag which is readily adaptable to continuous assembly line manufacture.

A further object of the present invention is the provision of a plastic bag which may be easily stored by hanging after being opened while at the same time maintaining a partial sealing of the upper edge thereof.

A further object of the present invention is the provision of a plastic bag which is attractive in appearance, durable in use and economical to manufacture.

BRIEF DESCRIPTION OF THE FIGURES OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

DETAILED DESCRIPTION

Figure 1:
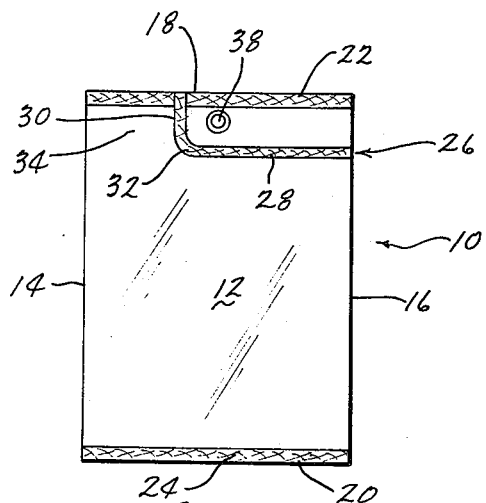
FIG. 1 is a front view of a plastic bag of the present invention formed from a seamless tube.

Referring to FIG. 1, a plastic bag 10 is formed from a seamless plastic tube 12 which is folded flat to form two lateral edges 14 and 16, and upper edge 18 and a lower edge 20. Extending transversely across tube member 12 at its upper edge 18 is an upper sealing strip 22, and extending across the lower edge 20 of tube 12 is a lower sealing strip 24. A reinforcing sealing strip 26 includes a horizontal portion 28, a vertical portion 30, and an arcuate corner 32 joining portions 28, 30. Horizontal portion 28 is spaced downwardly a short distance from upper sealing strip 22 and extends partially transversely across tube 12. Vertical portion 30 extends upwardly from arcuate portion 32 and joins sealing strip 22 at a point spaced from lateral edge 16. Thus reinforcing seal 26 forms a pouring spout 34 in the space between vertical portion 30 and lateral edge 14. Pouring spout 34 is normally sealed by upper sealing strip 22, but whenever it is necessary to open bag 10, the portion of sealing strip 22 to the left of reinforcing strip 26 may be snipped open with scissors or otherwise opened so as to provide access through the upper end of pouring spout 34.

The contents of bag 10 may be poured outwardly through pouring spout 34. The arcuate shape of arcuate portion 32 facilitates pouring powdered materials outwardly without causing the powdered materials to become clogged or otherwise retarded by reinforcing strip 26. This particular type of bag would also be advantageous for containing long slim items such as pencils, crayons, and the like. Each of the items could easily be removed through spout 34.

Figure 2:
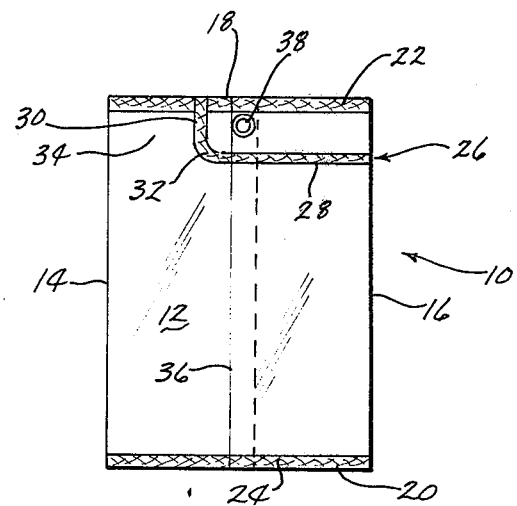
FIG. 2 is a front view of the modification of the present invention adapted for a bag having a vertical seam therein.

Referring to FIG. 2, a modified form of the present invention is shown wherein a plastic tube having a vertical seal 36 therein is utilized instead of the seamless tube shown in FIG. 1. Inasmuch as the remainder of the components of the bag are identical to those shown in FIG. 1, the same numerals are retained in FIG. 2 for those identical portions. Both the bag shown in FIG. 1 and the bag shown in FIG. 2 include a grommet 38 which is positioned in the space between reinforcing sealing strip 26 and upper sealing strip 22. More than one grommet may be used without detracting from the invention.

Figure 3:
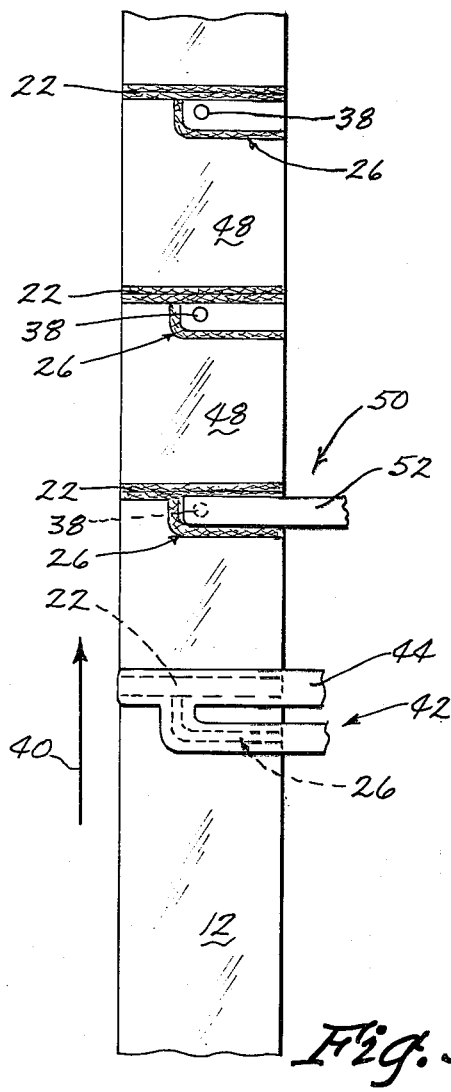
FIG. 3 is a top view of an assembly line production of the bag shown in FIG. 1.

Referring to FIG. 3, the method for making the bag shown in FIG. 1 is as follows. Seamless plastic tube 12 is of elongated continuous configuration. It is moved upwardly in FIG. 3 as indicated by the arrow 40. At a first station 42 a sealing bar 44 engages tube 12 and forms upper sealing strip 22 and reinforcing sealing strip 26 simultaneously. This is done at predetermined distances along the length of tube 12 so as to create a plurality of bag blanks 48 in end to end relationship.

At a second station 50 a grommet installing tool 52 installs grommet 38. Further down the assembly line, each bag blank 48 is severed immediately above upper sealing strip 22 so as to form a bag having a sealed upper edge formed by sealing strip 22 and an unsealed lower open end (not shown). Each bag blank 48 is then filled from the bottom with the contents which it is to hold, and a sealing bar is utilized to form lower sealing strip 24 to enclose the contents within bag 10.

Figure 4:
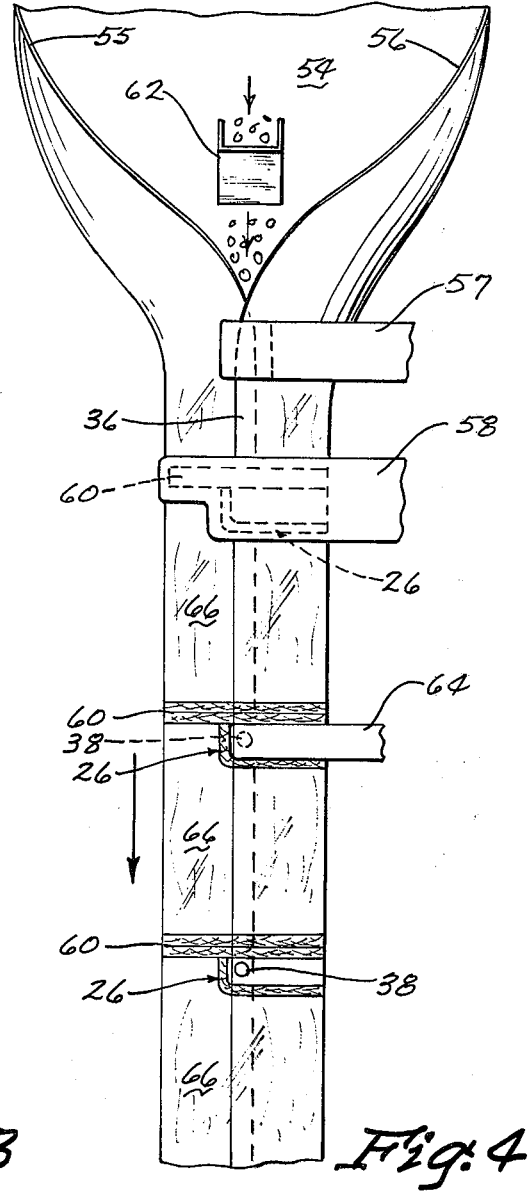
FIG. 4 is a front elevational view of an assembly line for manufacturing the bag shown in FIG. 2.

Referring to FIG. 4, the method fof forming the seam bag of FIG. 2 is shown. A flat plastic sheet member 54 having opposite lateral edges 55, 56 is passed downwardly as shown in FIG. 4. Lateral edges 55, 56 are folded over on one another so as to create a tube out of flat sheet member 54, the lateral edges 55, 56 forming a vertical seam in the tube. A seam sealing bar 57 heat seals or otherwise seals lateral edges 55, 56 together so as to form vertical seal 36 of the bag shown in FIG. 2. Immediately below seam sealing bar 56 is a top and bottom sealing bar 58. Sealing bar 58 forms reinforcing sealing strip 26 and also forms a double width straight sealing strip 60. After straight sealing strip 60 has been formed, a spout 62 empties a predetermined amount of materials into the tube above straight sealing strip 60. After the predetermined amount of materials have been dispensed into the tube, the tube continues on its downward vertical path, with seam sealing bar 56 continuously forming seal 36. After the tube has progressed a predetermined distance vertically downward, top and bottom sealing bar 58 forms new sealing strips 60, 26. Meanwhile, a grommet installing tool 64 forms a grommet 38 in the space between the previously formed reinforcing seal 26 and straight sealing strip 60. The net result of the above process is that a continuous line of filled bag blanks 66 is formed. Straight sealing strips 60 are then severed along a line which bisects each strip 60 whereby each straight strip 60 forms an upper sealing strip 22 of one bag and a lower sealing strip 24 of the bag immediately thereabove.

The pouring spout of the present invention permits a portion of the upper edge of the bag to be opened into a pouring spout while keeping the remainder closed and sealed. The smooth contour of corner 32 permits the easy removal of the contents of the bag without clogging or otherwise inhibiting the removal of the contents. As can be seen from FIGS. 3 and 4, the present invention is readily adaptable to continuous assembly line manufacture. It may be easily stored by using grommet 38 to hang the bag on a nail or other hook in a cupboard and at the same time, it maintains at least a partial sealing of the upper edge of the bag.

The present invention may be utilized with bags of different types other than those shown in the drawings. For example, bags having side seams on each of the two lateral sides thereof are often used in the industry, and the present invention may be utilized with this type of bag. Furthermore, it is not necessary that grommets be used. Instead it is possible merely to punch holes in the place of the grommets shown in the drawings. The grommets may be deleted, or they may be inserted at a different stage of the process than shown in the drawings.

Thus it can be seen that the bag of the present invention accomplishes at least all of its stated objectives.

I claim:

1. A method for making a plurality of plastic bags comprising:

forming a plurality spaced apart straight line seals across the width of an elongated continuous plastic tube member, said tube member being flattened, and having opposite lateral edges which combine with said straight line seals to form a plurality of rectangles in end to end relationship;

forming a reinforcing seal adjacent each of said straight line seals, each of said reinforcing seals commencing at one lateral edge of said tube member in a point spaced below said straight line seal and continuing partially across the width of said tube member in a direction parallel to said straight line seal and thence upwardly to join said straight line seal at a point spaced inwardly from the other lateral edge of said tube member;

placing a grommet in said tube members in the space between said reinforcing seal and said straight line seal; and severing said tube member transversely into a plurality of containers with said straight line seals forming upper sealed edges of each of said containers.

2. A method according to claim 1 wherein said straight line seals and said reinforcing seals are formed simultaneously by a single heat sealing bar.

3. A method according to claim 2 wherein said severing is done immediately above said straight line seal to form a plurality of containers having open bottoms, said containers being filled through said open bottoms, said open bottoms then being sealed to enclose the contents within said containers.

4. A method according to claim 1 comprising moving an elongated sheet member having lateral edges vertically downwardly beyond a seam sealing bar, folding said lateral edges into overlapping relationship prior to reaching said seam sealing bar;

sealing said overlapped edges with said seam sealing bar to form a vertical seam and an elongated vertical tube below said seam sealing bar;

forming one of said straight line seals and one of said reinforcing seals below said seam sealing bar;

filling said tube with a predetermined amount of material from above said straight line seal;

moving said sheet member vertically downwardly an additional predetermined distance so that an additional length of said tube member is formed by said seam sealing bar;

forming an additional straight line seal and reinforcing seal above said predetermined amount of material;

performing said severing step intermediate the width of said straight line seal to form an upper sealed edge of one bag and a lower sealed edge of another bag immediately above said one bag.

5. A method according to claim 1 comprising forming an arcuate corner at the point where said reinforcing seal turns upwardly from said parallel direction.

* * * * *